2,760,886
Patented Aug. 28, 1956

2,760,886

PROCESS FOR COATING METALS AND THE PRODUCTS OBTAINED

William C. Prentiss, Levittown, Adrienne H. Davis, Oxford, Lewis A. Wetzel, Philadelphia, and Virgil N. Sheets, Havertown, Pa., assignors to Rohm & Haas Company, Philadelphia, Pa., a corporation of Delaware No Drawing. Application January 24, 1955, Serial No. 483,794

20 Claims. (Cl. 117—72)

This invention is concerned with a process for decorating metals and for protecting metals from corrosion by the application of a polymeric coating and involves the novel procedure of applying an aqueous coating system directly to the metal for these purposes.

Heretofore metals have been protected from corrosion by the application of primers comprising certain corrosion-protective pigments in non-aqueous vehicles based on a drying oil such as linseed oil, a fast drying varnish base comprising natural resins or a mixture of natural and synthetic resins, or an alkyd base modified with a urea-, melamine-, or phenol-formaldehyde resin. Such coating compositions contain volatile solvents frequently of inflammable character and often of a type which gives off nocuous fumes during the coating operation. To cope with the fire and health hazards, protection is usually provided in the way of solvent recovery systems.

In the priming of metal surfaces, aqueous systems have heretofore been avoided because of the known tendency of water to initiate corrosion of the metal, especially such common metals as iron and steels which make up the bulk of the metal products that are provided with protective coatings of this sort. The initiation of corrosion and the development of rust, and oxides of iron and steels particularly, is contrary to the purpose of applying corrosion-protective primers; and the production of minute oxidized points or areas on the surface of the metals being primed generally has the effect of reducing adhesion and durability of coatings applied over such oxidized points.

Surprisingly, it has now been discovered, in accordance with the present invention, that under certain conditions highly alkaline aqueous dispersions of corrosion-protective pigments and certain linear copolymers comprising at least one ester of acrylic or methacrylic acid can be applied to metal surfaces and provide a durable, hard and resilient protective coating which readily receives top finish coatings of the same type of dispersion or of other common enamels or lacquers used for the finishing of metals. In order to provide a properly protective coating for the metal that will adhere substantially permanently thereto under normal conditions of usage and will also provide a good foundation for subsequent top-coatings, it has been found that certain important requirements must be met.

The first requirement is that the copolymer contain from ½% to 5% by weight (of the entire polymerized units therein) of carboxylate groups. The carboxylate groups required are those corresponding to the alkali metal, ammonium, or lower amine salts of acrylic acid, methacrylic acid, or itaconic acid. The amines referred to are the water-soluble lower amines including particularly methylamine, dimethylamine, and ethylamine. It appears that these groups are essential to provide adequate adhesion of the primer to the surface of the metal as well as to subsequently applied top-coating materials. Surprisingly, the presence of such carboxylate units in the copolymer can be tolerated without causing such corrosion of the surface of the metals, particularly iron and steel, as to cause rapid deterioration of the bond between the primer and the metal surface.

Another essential feature of the copolymer is that it must have a $T_i$ value between 5° C. and 100° C. and preferably between 15° C. and 60° C. The $T_i$ value referred to is the transition temperature or inflection temperature which is found by plotting the modulus of rigidity against temperature. A convenient method for determining modulus of rigidity and transition temperature is described by I. Williamson, British Plastics 23, 87–90, 102 (September, 1950). The $T_i$ value here used is that determined at 300 kg./cm.$^2$. For certain purposes, copolymers having a $T_i$ value of at least 35° C. are preferred. Thus, where the coating operation is of such a character that a large proportion of the coating may reach surfaces of the equipment or any other articles in the vicinity of the coating operation, as in cases where the coating is sprayed on to small items carried on a conveyor, the use of polymers having a $T_i$ of 35° C. or higher prevents the coalescence or fusion of the sprayed copolymer particles on the equipment. Instead, the drying at ordinary temperatures causes the deposits to dry out to discrete particles of the copolymer which can be readily brushed or wiped from the surface of the equipment, thereby providing ease of cleaning. On the other hand, there are times when copolymers having $T_i$ values above 60° C. would be unsuitable, particularly when extremely flexible parts are coated and it is desired to provide coatings thereon of adequate flexibility to assure that they do not interfere with the flexing of the parts after priming.

Suitable monomers, which may be copolymerized alone with the acid monomer to provide copolymers having $T_i$ values of at least 5° C., include the alkyl methacrylates having alkyl groups of not over four carbon atoms, tert-amyl methacrylate, tert-butyl acrylate, tert-amyl acrylate, cyclohexyl or benzyl acrylate or methacrylate.

On the other hand, there are many acrylic esters which, when polymerized, produce polymers having $T_i$ values less than 5° C. These monomers include primary and secondary alkyl acrylates whose alkyl groups have from 2 to 18 or more carbon atoms, and the primary and secondary alkyl methacrylates whose alkyl substituents have 6 to 18 or more carbon atoms. Typical compounds coming within the above definition are ethyl acrylate, propyl acrylate, isopropyl acrylate, butyl acrylate, isobutyl acrylate, sec-butyl acrylate, amyl acrylate, isoamyl acrylate, hexyl acrylate, 2-ethylhexyl acrylate, octyl acrylate, 3,5,5-trimethylhexyl acrylate, decyl acrylate, dodecyl acrylate, cetyl acrylate, octadecyl acrylate, octadecenyl acrylate, hexyl methacrylate, 2-ethylbutyl methacrylate, octyl methacrylate, 3,5,5-trimethylhexyl methacrylate, decyl methacrylate, dodecyl methacrylate, octadecyl methacrylate, butoxyethyl acrylate or methacrylate or other alkoxyethyl acrylate or methacrylate, etc.

These monomers which would normally produce polymers having $T_i$ values below 5° C. when homopolymerized may be copolymerized with a suitable proportion of one of the first-mentioned monomers, which on homopolymerization produce polymers having $T_i$ values above 5° C. The monomers whose homopolymers have low $T_i$ values may instead be copolymerized with acrylonitrile or methacrylonitrile to produce copolymers having adequately high $T_i$ values in the range of 5° to 100° C.

Examples of combinations which may be employed to produce copolymers with ½% to 5% of units derived from acrylic acid, methacrylic acid, and itaconic acid and having $T_i$ values well within the range of 5° to 100° C. include the following: ethyl acrylate-methyl methacrylate, up to about 7:3; ethyl acrylate-acrylonitrile, 4:1 to 1:2; propyl acrylate-acrylonitrile, 7:3 to 1:2; isopropyl acrylate-acrylonitrile, 9:1 to 1:3; isopropyl acrylate-methyl methacrylate, up to about 6:1; propyl acrylate-methyl methacrylate, up to about 1:1; butyl acrylate-acrylonitrile, 7:3 to 1:4; butyl acrylate-methyl methacrylate, up to about 1:1; isobutyl acrylate-acrylonitrile, 4:1 to 2:7; isobutyl acrylate-methyl methacrylate, up to about 3:2; sec-butyl acrylate-acrylonitrile, 5:1 to 1:3; sec-butyl acrylate-methyl methacrylate, up to about 7:3; 2-ethylhexyl acrylate-acrylonitrile, 2:1 to 1:5; 2-ethylhexyl acrylate-methyl methacrylate, up to about 1:1; 2-ethylhexyl acrylate-butyl methacrylate, up to about 1:9; 2-ethylhexyl acrylate-isobutyl methacrylate, up to about 3:7; ethyl acrylate-tert-butyl methacrylate, up to about 9:1; dodecyl acrylate-methyl methacrylate, up to about 2:3; hexyl methacrylate-butyl methacrylate, up to about 1:1. In every case the ultimate copolymer also contains from ½% to about 5% of carboxylate units.

A third important feature that is necessary is a high alkaline pH of the dispersion. The pH must be at least 9 and it may be as high as 11.

A fourth essential element is that there be a proper ratio between pigment and binder. This ratio may be from 0.5:1 to 5:1 and is preferably from about 1:5 to 2:1. At least 20% by weight of the pigment should be of a corrosion-protective type, namely, red lead, zinc oxide, basic lead carbonate (white lead) or iron oxides. The composition may also include extender pigments to increase covering power and/or to reduce the cost. Examples of such extenders are titanium dioxide or barytes.

Solids concentration of the dispersion may be varied at the time of application depending on the particular mode of application. Solids concentrations of 10% to 85% may be used.

The dispersions adapted to serve as primers in accordance with the present invention may be made by dispersing in water in the appropriate proportions the polymerizable $\alpha,\beta$-unsaturated monovinylidene carboxylic acid or a water-soluble salt thereof and the acrylic monomer or monomers, such as the ester of acrylic or methacrylic acid with or without another such ester or nitrile of acrylic or methacrylic acid. The monomers are dispersed with a surface-active water-soluble non-ionic polyethoxyethanol in an aqueous medium. Then a free radical polymerizing catalyst or initiator of the redox type is added and polymerization is effected. Then the pH of the dispersion is adjusted to a value of 9 to 9.8, preferably to a value from 9.3 to 9.6, by the addition of ammonia, an alkali metal base, or a water-soluble amine. Then the pigment or pigments are incorporated into the dispersion. While it is possible to mix pigments and an aqueous dispersion of an interpolymer of this invention and to grind the mixture, as on a three roll mill or in a colloid mill, it is generally better to prepare a paste of pigment or color in water, particularly with the aid of a dispersing agent and to combine such pastes with a dispersion of interpolymer. In the preparation of such pastes, water, pigment, and dispersing agent are best mixed. The mixture is then ground in a pebble mill, roll mill, colloid mill, or high speed stone mill, or in some instances in a high shear mixer. Consistency of paste is controlled by the dispersing agent and the amount of water used. Sometimes vehicle (dispersion of interpolymer) may be added to the pigment paste to be ground. Where foaming may occur, however, this practice is not recommended.

The emulsifiers which have been found needed to disperse or emulsify the present combinations of monomers and to maintain the formed interpolymers in stable suspension are non-ionic surface-active agents. These are composed of a hydrophobic or hydrocarbon portion and a hydrophilic portion. The latter is a polyether chain usually terminated with an alcoholic hydroxyl group. This is of sufficient size to render the agents water-soluble. For combinations of monomers in which polar groups form a relatively good proportion it is preferred that the non-ionic agents have 20 to 50 ether groups in the hydrophilic portion. When the combination of polymerizable monomers has a relatively high hydrocarbon content, best results are usually had with non-ionic agents having a relatively small proportion of ether groups. These principles will guide the selection of the most effective emulsifiers for the particular monomers chosen for the preparation of suspensions of resulting interpolymers.

Typical emulsifiers which may be used include alkylphenoxypolyethoxyethanols having alkyl groups of about seven to twelve carbon atoms, such as heptylphenoxypolyethoxyethanols, octylphenoxypolyethoxyethanols, methyloctylphenoxypolyethoxyethanols, nonylphenoxypolyethoxyethanols, dodecylphenoxypolyethoxyethanols, and the like; polyethoxyethanol derivatives of methylene linked alkyl phenols; sulfur-containing agents such as those made by condensing the required proportion of ethylene oxide with nonyl, dodecyl, tetradecyl, and the like mercaptans or with alkylthiophenols having alkyl groups of six to fifteen carbon atoms; ethylene oxide derivatives of long-chain carboxylic acids, such as lauric, myristic, palmitic, oleic, and the like or mixtures of acids such as found in tall oil; ethylene oxide condensates of long-chained alcohols, such as octyl, decyl, lauryl, or cetyl alcohols, ethylene oxide derivatives of etherified or esterified polyhydroxy compounds having a hydrophobic hydrocarbon chain, etc.

The amounts of emulsifier or emulsifiers required vary primarily with the concentration of monomers to be handled and to a minor extent with choice of emulsifier, monomers, and proportions of monomer. Generally, the amount of emulsifying agent is between 2% and 12% of the weight of the mixture of monomers and is preferably 4% to 7% of this weight. If the dispersion is to contain a relatively low concentration of interpolymer somewhat more than the minimum emulsifying agent indicated by the above rule may prove desirable. In such case the concentration of emulsifying agent in the aqueous solution may desirably be at least 1% of this solution and may be as much as about 7% of the weight of the aqueous solution thereof.

As the polymerization catalyst there may be used one or more peroxides which are known to act as free radical catalysts and which have solubility in aqueous solutions of the emulsifier. Highly convenient are the persulfates, including ammonium, sodium and potassium persulfates or hydrogen peroxide or the perborates or percarbonates. But there may also be used organic peroxides, either alone or in addition to an inorganic peroxidic compound. Typical organic peroxides include benzoyl peroxide, tert-butyl hydroperoxide, cumene peroxide, tetralin peroxide, acetyl peroxide, caproyl peroxide, tert-butyl perbenzoate, tert-butyl diperphthalate, methyl ethyl ketone peroxide, etc. The preferred organic peroxides have at least partial solubility in the aqueous medium containing the emulsifying agent. Choice of inorganic or organic peroxidic catalyst depends in part upon the particular combination of monomers to be interpolymerized, some of these responding better to one type than the other.

The amount of peroxidic catalyst required is roughly proportional to the concentration of the mixture of monomers. The usual range is 0.01% to 3% of catalyst with reference to the weight of the monomer mixture. The preferred range is from 0.05% to 0.5%, while the range of 0.1% to 0.25% is usually best. The optimum amount of catalyst is determined in large part by the nature of the particular monomers selected, including impurities which accompany particular monomers.

In order to effect interpolymerization at a temperature below that at which coagulation might occur, it is desirable to activate the catalyst. This may best be accomplished by using a so-called redox system in which a reducing agent is present in addition to the peroxidic catalyst. Many examples of such systems are known. Agents such as hydrazine or a soluble sulfite, including hydrosulfites, sulfoxalates, thiosulfates, sulfites, and bisulfites can be used. Examples of these are sodium hydrosulfite, sodium metabisulfite, potassium sulfite, zinc formaldehyde-sulfoxalate, and calcium bisulfite. Redox systems may be activated by the presence of a small amount of polyvalent metal ions. Ferrous ions are commonly and effectively thus used, a few parts per million being sufficient. The peroxidic catalyst may also be activated by the presence of a tertiary amine which is soluble in the reaction medium, such as dimethylethanolamine or triethanolamine.

The amounts of reducing agent or amine required vary somewhat with the choices of peroxide initiator, reducing activator or agents, and metal promoter, if used, also with the choice of emulsifying agent, and with the particular monomers involved. Yet within the limits of about 0.5% to 6% with reference to the weight of the mixture of monomers will be found the amount of reducing agent for practically any system. The preferred amounts of sulfite agent or equivalent fall in the range of 0.2% to 1%.

Copolymerization is best effected below about 80° C. A preferred range is 15° to 70° C., although slightly lower and somewhat higher temperatures are permissible. After most of the monomers have been converted to interpolymer, temperatures even higher than 80° C. may then be applied. In fact after most of the monomers have interpolymerized, the resulting suspension can be heated to boiling without breaking the suspension. During interpolymerization the temperature can be controlled in part through the rate at which monomers are supplied and interpolymerized and/or through applied cooling.

The polymerization process can be carried out batchwise or continuously. It is possible to work entirely batchwise, emulsifying the entire charge of monomers and proceeding with polymerization. It is usually advantageous, however, to start with part of the monomers which are to be used and add more monomer or monomers as polymerization proceeds. An advantage of gradual addition of monomers lies in reaching a high solids content with optimum control and with maximum uniformity of product. Additional catalyst or additional components of the redox system may also be added as polymerization proceeds.

In the process of polymerization here described an aqueous emulsion of a mixture of the defined polymerizable monomers is stirred and treated with a redox system starting between about 10° C. and about 40° C. About 0.01% to 1% of a peroxidic catalyst based on the weight of the monomers used is usually an effective amount at the start and the required amount of reducing substance, hydrosulfite, sulfite metabisulfite, or the equivalent for this system, may be of the same order or somewhat more by weight. When interpolymerization starts, the temperature of the mixture rises, usually rather rapidly. Care is taken to keep the temperature of the mixture below the levels at which coagulation might occur.

Amounts of monomers are supplied to bring the content of suspended interpolymer to 25% to 60% of the total suspension, preferably to 45% to 55%. Interpolymerization or copolymerization should be carried on until no more than a few per cent of monomers remain in the mixture. When these monomers are volatile, they can be reduced or removed by steam distillation or stripping under reduced pressure, if so desired.

With the attainment of desired interpolymer content in good yield, with or without removal of residual monomers, the suspension is cooled, cooling to a range of 50° to 20° C. being generally satisfactory. The suspension is then rendered mildly alkaline by adding ammonia or a water-soluble amine, or an inorganic base, such as potassium hydroxide, or a mixture thereof. As organic bases there may be used morpholine, piperidine, pyrrolidine, triethanolamine, dimethylethanolamine, ethanolamine, propanolamine, diethanolamine, or the like, particularly amines of molecular weights not over 150. A combination of an organic base and ammonia is often particularly useful. Ammonia, usually giving the best results in the simplest way, is preferred.

In some instances, it may be desired at this point to make an adjustment of the viscosity of the alkaline suspension as by adding a small amount of a thickening agent, such as sodium alignate, sodium or ammonium polyacrylate, methylcellulose, or the like. In this way compensation may be made for possible minor variations in viscosity from batch to batch of suspensions.

Certain conditions are necessary to be observed in order to make the use of these dispersions practical as primers for the metals. While the dispersions may be applied by any suitable means or equipment, such as with spray equipment, by brushes, rollers, or by dipping, it is an essential of the present invention that the coating be baked at a temperature of at least 250° F. for a period of about ¾ hour, or at higher temperatures for somewhat lesser periods, such as at 300° F. for about ½ hour or at 325° F. for 20 to 25 minutes. The temperatures may range up to 375° to 400° F. with corresponding reduced times of five to fifteen minutes. It has been found that baking at temperatures of 300° F. or higher has a pronounced effect on the hardness and the quality of adhesion to the base metal. While baking at lower temperatures improves the hardness somewhat over drying at ordinary temperatures above the $T_i$ value of the copolymer, there is a pronounced increase in hardness and also adhesion when baking is effected at temperatures of 300° F. and higher. While it is not desired to be limited to any particular theory, it nevertheless appears that the carboxylate groups of the copolymer are bonded to the surface of the metal by ion-interchange therebetween; and this interchange seems to be quite marked only when baking is effected at temperatures of 250° F. and higher.

While freshly applied coatings of copolymers which have a $T_i$ value below the temperature of application may be dried at any temperatures above the $T_i$ value of the respective copolymer before elevating the temperature to the baking range specified above, nevertheless it is preferred to apply baking temperatures to the wet coating directly before any appreciable drying is allowed to take place. This preferred procedure, regardless of the $T_i$ value of the copolymer results in the production of the optimum hardness and adhesion obtainable therefrom in conjunction with the maximum uniformity of surface on the coating. However, when a top coat is applied, the first coating may be dried without baking and after the top coat is applied, simultaneous baking of both coatings may be effected with good results.

In drying the first coat, elevated temperatures should be used wherever possible, and as pointed out above it is preferable to promptly apply baking temperatures directly to the wet coating. The drying and baking may be effected by the application of heat through hot air convection currents, infrared lamps or other infrared equipment, radio frequency heaters, and the like.

The coating may be applied to all sorts of metals and is particularly useful for the decoration and protection from corrosion, of iron, steel, aluminum, magnesium, copper and alloys. It is particularly valuable for the priming of phosphatized iron or steel, such as the bonderized or parkerized types as well as deoxidized steel, galvanized iron and anodized aluminum. All sorts of metal articles may be so primed such as automobile parts, accessories and bodies, and home appliances such as refrigerators and ironers.

The copolymer in the coating of the present invention is apparently not thermoset or insolubilized. At least it is not completely insolubilized or rendered completely infusible by the baking operation of the present invention. It still retains its resilience and toughness.

but the baking operation apparently improves the amenability of the coating to sanding. Thus the sandpaper is not rendered gummy by such operations. Furthermore, the coating is still susceptible to be rendered adhesive or tacky by subsequently applied top coating compositions or organic solvent type. Consequently, such finishing coatings may be subsequently applied over the baked primer and air-dried or baked with good adhesion to the primer. Top coatings having aromatic hydrocarbon solvents, such as toluene, xylenes, and so on or alcoholic solvents, such as butanols and glycols, as well as the lacquer solvents including amyl acetate and acetone, all render the primer coating tacky but do not penetrate so deeply as to interfere with good "hold-out" of the final coating or as to destroy or reduce the adhesion of the initial coatings. Thus top coatings of lacquer type containing cellulose derivatives, including nitrocellulose or cellulose acetate dissolved in acetone, may be employed as the top coating as well as the automotive type of baking enamels made with semi-oxidizing alkyds modified with melamine-formaldehyde resins. Special enamels adapted to produce wrinkle finishes, hammer finishes and spatter finishes may also be applied with good adhesion and hold-out.

The utilization of aqueous based primers for the protection of metals from corrosion and for preparing them for final finishing has numerous advantages. An important one is the fact that they are readily diluted by the user by the mere addition of water. They encounter no fire or health hazards because of inflammable or nocuous fumes; and they, therefore, require no special solvent recovery equipment or special protective equipment to be worn by the operators.

Various auxiliary materials may also be used in preparing the water-base primers. These include dispersing agents for dispersing and maintaining in a finely divided state the pigments, colors, or extenders, such as aromatic sulfonates condensed with formaldehyde or any of the suitable commercial dispersing agents which are available for this purpose; sequestering agents for controlling polyvalent metal ions sometimes introduced by pigments, colors, or extenders, such as complex alkali metal phosphates or ethylene polyaminoacetates; defoaming agents, including waxes, oils, or mineral spirits, or an alkylphenoxyethanol, fatty acid amides, often from a polyamine, phosphate esters, or a solution of an amine or amide in an oil; humectants, such as water-soluble gums, ammonium or sodium polyacrylate, glycol laurate, propylene glycol, diethylene glycol, etc.; thickeners, such as water-soluble gums, water-soluble polyacrylates and methacrylates, water-dispersed starches and proteins, etc.; bacetericides and/or fungicides, such as borax, pentachlorophenols, or mercury compounds; perfume-like materials, including neutralizing and masking agents, which are used to overcome odors or to impart pleasant and distinctive odors; other resinuous materials in dispersed form, such as alkyd resins, drying oils, or latices of styrene or of styrene and butadiene to cheapen and extend the binders of this invention, and auxiliary corrosion-inhibiting agents, such as sodium benzoate, sodium dichromate, guanyl urea phosphate, or sodium nitrite, in an amount of 0.05% to 5%, and most commonly 0.1% to 2% of the dispersed copolymer, etc. Surprisingly, however, the aqueous coating systems of the present invention can be applied to ferrous metal surfaces even without auxiliary corrosion-inhibitors and on drying do not show any corrosion of the metal.

In preparing the pigmented compositions of the present invention, the pigment may be introduced into the aqueous copolymer dispersion in various ways. It may simply be added in dry, finely divided form to the copolymer dispersion with stirring and/or more or less grinding or milling action, the addition being preferably made gradually. This procedure is generally most suitable with high speed mixers, blenders or mills when the copolymer dispersion is relatively dilute, of the order of 10% to 20% solids concentration without the pigment. Dispersing agents of non-ionic or anionic types or a mixture of both types should be present in the dispersion, or added thereto, before, during or after the pigment addition, in adequate amount to maintain the copolymer in dispersed condition and also to disperse the pigment added. However, in most instances, it is preferred to disperse the pigment or pigments in a small amount of water with one or more dispersing agents of the types just mentioned before combining the pigment with the copolymer dispersion. This may be effected by adding the pigment gradually to the small amount of water (to which the dispersing agent or agents have been added or are simultaneously added with the pigment) while merely stirring during the addition or with a certain amount of grinding or milling, depending on the ease of dispersibility of the pigment. Part of the water may be added during the addition of the pigment and/or part may be added after the pigment has been added. Then the pigment dispersion may be combined with the copolymer dispersion by adding either one to the other, preferably gradually, while stirring, and, if necessary, grinding or milling. Whichever procedure is employed, when several pigments are to be mixed in, they may be added as a dry mixture or separately in any order desired. Titanium dioxide and many colored pigments demand more water than others and especially extenders, examples of which include barium sulfate, lithopone, calcium carbonate, and basic lead carbonate. When forming highly concentrated pastes or dispersions of mixtures of pigments one or more of which have relatively high water demand and one or more others of which have relatively low water demand, it is sometimes found that selection of a particular order of addition facilitates dispersion and provides a more permanently dispersed pigment in the final pigmented copolymer dispersion. For example, in some cases, it may be desirable to add the high water demand pigment or pigments first or after only a portion of the low water demand pigment or pigments have been added so that the completion of the addition of the high water demand pigment to the aqueous medium is accomplished before its consistency or viscosity is markedly increased. The addition of the low water demand pigment or remainder thereof is then made.

In the processes of the following examples for applying representative primers in accordance with the present invention, the parts given are by weight unless otherwise noted:

*Example 1*

(a) A solution is prepared of 25 parts of an octylphenoxypolyethoxyethanol having about 30 ether groups in 1000 parts of water. There are mixed 280 parts of ethyl acrylate, 140 parts of methyl methacrylate, and 5.5 parts of methacrylic acid. This mixture is added with stirring to the solution. The resulting mixture is cooled to 15° C. A solution of 0.5 part of ammonium persulfate in 1.5 parts of water is then added, followed by addition of a solution of 0.6 part of sodium hydrosulfite in six parts of water. Stirring is continued. In a few minutes the temperature of the mixture begins to rise and continues to rise, reaching about 65° C. in a half hour. After five minutes the mixture is cooled to about 15° C. There are now added 35 parts of the same octylphenoxypolyethoxyethanol, 315 parts of ethyl acrylate, 155 parts of methyl methacrylate, 6 parts of methacrylic acid, a solution of 0.6 part of ammonium persulfate in 1.5 parts of water, and 0.8 part of sodium hydrosulfite in six parts of water. In a short time, the temperature of the mixture rises, a maximum of about 65° C. again being reached. Stirring is continued for an hour and then while the batch is cooled to 30° C., ammonium hydroxide solution is added until a pH of 9.5 is reached. The resulting product is a dispersion of an interpolymer of ethyl acrylate, methyl methacrylate, and methacrylic acid in over a 99% yield.

(b) There are mixed and ground in a pebble mill 190 parts of titanium dioxide and 190 parts of zinc oxide in 189.5 parts of water containing 7.2 parts of diethylene glycol and as dispersing agents 3.8 parts of the sodium salt of a maleic anhydride/diisobutylene copolymer having a number average molecular weight of 3000 and 1.9 parts of an octylphenoxypolyethoxyethanol containing an average of about 11 oxyethylene units. When this mixture has been ground to a smooth, uniform paste, it is mixed with 516.0 parts of a dispersion of the interpolymer, which contains 46% solids, prepared by the procedure of part (a) hereof. When the parts used are pounds, this formula yields 100 gallons of a white primer. It weighs 11.96 pounds per gallon, contains 59.6% of non-volatile matter, has a pigment to binder ratio of about 1.6:1. The resulting composition is an excellent primer for refrigerators, ironers and other household appliances that are finally coated with white or pastel-colored enamels and lacquers. Baking of the primer at about 305° F. for 30 minutes is effected promptly after coating.

(c) The procedure of part (b) hereof is repeated substituting 400 parts of red iron oxide for the titanium dioxide. The composition is an excellent primer for bonderized steel automotive bodies and parts. After coating by spray equipment, the wet parts are promptly introduced into an oven at 315° F. for 30 minutes. Then the parts are coated with a nitrocellulose lacquer which is force-dried at 140° F.

*Example 2*

(a) A solution is prepared from 30 parts of an octylphenoxypolyethoxyethanol having about 45 ether groups in 1000 parts of water. To this are added with stirring 160 parts of butyl acrylate and 255 parts of methyl methacrylate. The reaction vessel is now flooded with nitrogen. There are added 0.5 part of ammonium persulfate and 0.7 part of sodium hydrosulfite. A solution is prepared from four parts of glacial acrylic acid in 56 parts of water and this is added in small increments while the temperature rises 40° C. Stirring is continued for an hour at elevated temperature. The batch is then cooled to 20° C. There are added 30 parts of the same nonionic compound, 200 parts of butyl acrylate, 275 parts of methyl methacrylate, 0.6 part of ammonium persulfate, and 0.8 part of sodium hydrosulfite. The temperature starts to rise again. A solution of five parts of glacial acrylic acid in 65 parts of water is slowly and continuously added until the temperature rises to 60° C. The temperature continues to rise to 70° C. The batch is then cooled to 20° C. and treated with ammonia to a pH of 9.5. The product is a stable dispersion of interpolymer in a yield of 99%.

(b) There are dissolved in 95 parts of water, 6.8 parts of formaldehyde-condensed sodium naphthalene sulfonate and 7.2 parts of diethylene glycol. Then 100 parts of titanium dioxide are gradually added while stirring and 375 parts of basic lead carbonate are gradually added to the solution and the slurry is stirred until it is converted to a smooth paste. The resulting paste is thoroughly mixed with 520 parts of the co-polymer dispersion of part (a) hereof and ammonia is added to adjust the pH to 9.5. This composition is an excellent primer for galvanized iron parts which may be coated with the primer by dipping. After excess has dripped off, baking at 325° F. is effected for 25 minutes and an alkyd enamel is applied and baked on as the final coat.

*Example 3*

(a) A solution of 10 parts of nonylphenoxypolyethoxyethanol with about 50 ether groups and 15 parts of methylene bis(diamylphenoxypolyethoxyethanol) having about 40 total ether groups is prepared in 1000 parts of water and the solution is cooled to about 15° C. To this are added with stirring 60 parts of lauryl acrylate, 355 parts of methyl methacrylate, and 6.5 parts of glacial methacrylic acid. There are then stirred in 0.7 part of sodium hydrosulfite and 0.6 part of potassium persulfate, followed by 0.006 part of ferrous sulfate crystals. Polymerization starts in a few months and the temperature rises to about 65° C. The dispersion is then treated with 0.6 part of tert-butyl hydroperoxide. After about a half hour the dispersion is cooled to 45° C. and treated with ammonia until a pH of 9.3 is attained. The product is a stable dispersion of interpolymer.

(b) In 166 parts of water, there is dissolved 0.9 part of a water-soluble sulfonated polystyrene dispersing agent and 7 parts of diethylene glycol. Then 1.2 parts of an oil is added as a defoamer. Then 550 parts of red lead are pasted in the mixture and ground in a pebble mill for two hours. The paste is then mixed thoroughly with 475 parts of the copolymer dispersion of part (a) hereof. Iron and steel parts are sprayed with the paint thus obtained. Promptly after spraying, the parts, while their coating is still wet, are subjected to baking conditions at 300° F. for 35 minutes. A final colored alkyd enamel is applied and baked on at 305° F. for 30 minutes.

(c) The procedure of parts (a) and (b) were repeated except that the first baking operation is replaced with a drying operation at 140° F.

*Example 4*

(a) A solution of 25 parts of octylphenoxypolyethoxyethanol in 1000 parts of water is prepared. Thereto are added 260 parts of ethyl acrylate, 155 parts of tert-butyl methacrylate, and 4 parts of itaconic acid. There is added with stirring a solution of 0.5 part of ammonium persulfate in 1.5 parts of water and a solution of 0.7 part of sodium hydrosulfite in 6 parts of water. Temperature soon begins to rise, a maximum of about 68° C. being reached. The dispersion thus formed is stripped practically free of residual monomer by maintaining it at about 68° to 65° C. at reduced pressures. The dispersion is cooled to about 40° C. and the pH is brought to 9.5 with a stream of gaseous ammonia. A stable dispersion of interpolymer is thus obtained.

(b) There are mixed and ground in a pebble mill 190 parts of titanium dioxide, 190 parts of ZnO, 6.8 parts of the formaldehyde-condensed sodium naphthalene sulfonate, 7.2 parts of diethylene glycol, and 189.5 parts of water. When this mixture has been ground to a smooth, uniform paste, it is mixed with 516.0 parts of a dispersion of interpolymer, which contains 46% solids and which has been prepared as in part (a) hereof. Parkerized steel refrigerators are coated with this primer and while the coating is still wet, they are baked at 330° F. for 25 minutes. After light sanding, a melamine-formaldehyde modified white alkyd enamel in an organic solvent system comprising butanol as the major solvent is applied over the primer and baked at 325° F.

*Example 5*

(a) A solution is prepared from 25 parts of diamylphenoxypolyethoxyethanol having about 25 ether groups in 1000 parts of water. The solution is cooled to 13° C. The vessel is flushed with nitrogen. There are added with stirring 415 parts of benzyl acrylate and 6.5 parts of methacrylic acid (100%). There are added 0.5 part of ammonium persulfate, then one part of sodium metabisulfite, and 0.006 part of ferrous sulfate. In about 10 to 20 minutes the temperature of the mixture begins to rise. When 60° C. is reached a charge of 0.3 part of tert-butyl perbenzoate is slowly added. The temperature continues to rise to about 70° C. and remains at this level for 20 minutes until reduced pressure is applied. The batch is cooled under reduced pressure. At 30° C. cooling is discontinued. Morpholine is added to a pH of 7.5 and ammonia is added to bring the pH to 9. A stable dispersion of interpolymer is thus produced.

(b) There are mixed and ground in a pebble mill 190 parts of titanium dioxide, 190 parts of ZnO, 6.8 parts of the formaldehyde-condensed sodium naphthalene sulfonate, 7.2 parts of diethylene glycol, and 189.5 parts of water. When this mixture has been ground to a smooth, uniform paste, it is mixed with 516.0 parts of a dispersion of interpolymer, which contains 46% solids and which has been prepared as in part (a) hereof. Bonderized steel refrigerators are coated with this primer and while the coating is still wet, they are baked at 330° F. for 25 minutes. After light sanding, a melamine-formaldehyde modified white alkyd enamel in an organic solvent system comprising butanol as the major solvent is applied over the primer and baked at 325° F.

*Example 6*

(a) A solution is prepared from 16 parts of an octylphenoxypolyethoxyethanol having about 11 ether groups, six parts of a water-soluble non-ionic emulsifier prepared from the resinous condensate of diisobutylphenol and formaldehyde by reaction with ethylene oxide, and 969 parts of water. There is added thereto with stirring a mixture of 140 parts of dodecyl methacrylate, 280 parts of acrylonitrile, and five parts of methacrylic acid. The resulting emulsion is blanketed with nitrogen and treated with a solution of 0.5 part of ammonium persulfate in 1.5 parts of water followed by addition of 0.6 part of sodium hydrosulfite in six parts of water. The temperature of the mixture rises slowly and is maintained at about 70° C. for two hours. An additional charge of 0.1 part of ammonium persulfate in water is made. The bath is cooled below 40° C. and treated with ammonia gas to a pH of 9.6 to give a stable dispersion useful in coating applications.

(b) There are mixed and ground in a pebble mill 190 parts of titanium dioxide, 190 parts of ZnO, 6.8 parts of the formaldehyde-condensed sodium naphthalene sulfonate, 7.2 parts of diethylene glycol, and 189.5 parts of water. When this mixture has been ground to a smooth, uniform paste, it is mixed with 516.0 parts of a dispersion of interpolymer, which contains 46% solids and which has been prepared as in part (a) hereof. Bonderized steel refrigerators are coated with this primer and while the coating is still wet, they are baked at 330° F. for 25 minutes. After light sanding, a melamine-formaldehyde modified white alkyd enamel in an organic solvent system comprising butanol as the major solvent is applied over the primer and baked at 325° F.

It is to be understood that changes and variations may be made without departing from the spirit and scope of the invention as defined in the appended claims.

We claim:

1. A process for coating a metal which comprises applying to the surface of the metal a coating of an aqueous alkaline dispersion, having a pH of at least 9, of a pigment, of which at least 20% by weight is a corrosion-protective pigment, and a salt of a linear copolymer of (a) ½% to 5% by weight in the copolymer of an acid selected from the group consisting of acrylic, methacrylic and itaconic acids and (b) an ester of an acid of the group consisting of acrylic and methacrylic acids, said copolymer having a $T_i$ value of at least 5° C. and the ratio of pigment to binder being from 0.5:1 to 5:1, and subsequently subjecting the coated metal to baking temperatures of at least 250° F.

2. A process for protectively coating a metal which comprises applying to the surface of the metal a coating of an aqueous alkaline dispersion, having a pH of at least 9, of a corrosion-protective pigment and a salt of a linear copolymer of (a) ½% to 5% by weight in the copolymer of an acid selected from the group consisting of acrylic, methacrylic and itaconic acids and (b) an ester of an acid of the group consisting of acrylic and methacrylic acids, said copolymer having a $T_i$ value of 5° C. to 100° C. and the ratio of pigment to binder being from 0.5:1 to 5:1, subsequently subjecting the coated metal to baking temperatures of at least 250° F., and applying a lacquer top coat thereover.

3. A process for protecting a metal from corrosion which comprises applying to the surface of the metal a coating of an aqueous alkaline dispersion, having a pH of at least 9, a corrosion-protective pigment and a salt of a linear copolymer of (a) ½ to 5% by weight in the copolymer of an acid selected from the group consisting of acrylic, methacrylic and itaconic acids and (b) an ester of an acid of the group consisting of acrylic and methacrylic acids, said copolymer having a $T_i$ value of 15° C. to 60° C. and the ratio of pigment to binder being from 0.5:1 to 5:1, and subsequently subjecting the coated metal to baking temperatures of 250° F. to 400° F. for a period from about 45 minutes to about 5 minutes respectively.

4. A process for protecting a metal from corrosion which comprises applying to the surface of the metal a coating of an aqueous alkaline dispersion, having a pH of at least 9, of a corrosion-protective pigment and a salt of a linear copolymer of (a) ½ to 5% by weight in the copolymer of an acid selected from the group consisting of acrylic, methacrylic and itaconic acids and (b) an ester of the group consisting of alkyl methacrylates having alkyl groups of 1 to 4 carbon atoms, tert-amyl methacrylate, tert-butyl acrylate, tert-amyl acrylate, cyclohexyl acrylate, cyclohexyl methacrylate, benzyl acrylate, and benzyl methacrylate, said copolymer having a $T_i$ value of 5° C. to 100° C. and the ratio of pigment to binder being from 0.5:1 to 5:1, and subsequently subjecting the coated metal to baking temperatures of 250° F. to 400° F. for a period from about 45 minutes to about 5 minutes respectively.

5. A process as defined in claim 4 in which the copolymer is a copolymer of ethyl acrylate, methyl methacrylate and methacrylic acid.

6. A process as defined in claim 4 in which the copolymer is a copolymer of butyl acrylate, methyl methacrylate and acrylic acid.

7. A process as defined in claim 4 in which the copolymer is a copolymer of lauryl acrylate, methyl methacrylate, and methacrylic acid.

8. A process as defined in claim 4 in which the copolymer is a copolymer of ethyl acrylate, tert-butyl methacrylate, and itaconic acid.

9. A process as defined in claim 4 in which the copolymer is a copolymer of benzyl acrylate and methacrylic acid.

10. A process as defined in claim 4 in which the copolymer is a copolymer of dodecyl methacrylate, acrylonitrile, and methacrylic acid.

11. As an article of manufacture, a metal having baked on its surface a coating comprising a pigment, of which at least 20% by weight is a corrosion-protective pigment, and a salt of a linear copolymer of (a) ½ to 5% by weight in the copolymer of an acid selected from the group consisting of acrylic, methacrylic and itaconic acids and (b) an ester of an acid of the group consisting of acrylic and methacrylic acids, said copolymer having a $T_i$ value of at least 5° C. and the ratio of pigment to binder being from 0.5:1 to 5:1.

12. As an article of manufacture, a metal having baked on its surface a coating comprising a corrosion-protective pigment and a salt of a linear copolymer of (a) ½ to 5% by weight in the copolymer of an acid selected from the group consisting of acrylic, methacrylic and itaconic acids and (b) an ester of an acid of the group consisting of acrylic and methacrylic acids, said copolymer having a $T_i$ value of 15° C. to 60° C. and the ratio of pigment to binder being from 0.5:1 to 5:1.

13. As an article of manufacture, a metal having baked on its surface a coating comprising a corrosion-protective pigment and a salt of a linear copolymer of (a) ½ to 5% by weight in the copolymer of an acid selected from the group consisting of acrylic, methacrylic and itaconic acids and (b) an ester of the group consisting of alkyl methacrylates having alkyl groups of 1 to 4 carbon atoms, tert-amyl methacrylate, tert-butyl acrylate, tert-amyl acrylate, cyclohexyl acrylate, cyclohexyl methacrylate, benzyl acrylate, and benzyl methacrylate, said copolymer having a $T_i$ value of 5° C. to 100° C. and the ratio of pigment to binder being from 0.5:1 to 5:1.

14. An article as defined in claim 13 in which the copolymer is a copolymer or ethyl acrylate, methyl methacrylate and methacrylic acid.

15. An article as defined in claim 13 in which the copolymer a copolymer of butyl acrylate, methyl methacrylate and acrylic acid.

16. An article as defined in claim 13 in which the copolymer is a copolymer of lauryl acrylate, methyl methacrylate, and methacrylic acid.

17. An article as defined in claim 13 in which the copolymer is a copolymer of ethyl acrylate, tert-butyl methacrylate, and itaconic acid.

18. An article as defined in claim 13 in which the copolymer is a copolymer of benzyl acrylate and methacrylic acid.

19. An article as defined in claim 13 comprising a lacquer top coat over the copolymer salt.

20. A process for protecting a metal from corrosion which comprises applying to the surface of the metal a coating of an aqueous alkaline dispersion, having a pH of at least 9, of a corrosion-protective pigment and a salt of a linear copolymer of (a) ½ to 5% by weight in the copolymer of an acid selected from the group consisting of acrylic, methacrylic and itaconic acids and (b) an ester of the group consisting of alkyl methacrylates having alkyl groups of 1 to 4 carbon atoms, tert-amyl methacrylate, tert-butyl acrylate, tert-amyl acrylate, cyclohexyl acrylate, cyclohexyl methacrylate, benzyl acrylate, and benzyl methacrylate, and (c) an ester of the group consisting of primary and secondary alkyl acrylates whose alkyl groups have 2 to 18 carbon atoms, and primary and secondary alkyl methacrylates whose alkyl groups have 6 to 18 carbon atoms, said copolymer having a $T_i$ value of 5° C. to 100° C. and the ratio of pigment to binder being from 0.5:1 to 5:1, and subsequently subjecting the coated metal to baking temperatures of 250° F. to 400° F. for a period from about 45 minutes to about 5 minutes respectively.

References Cited in the file of this patent

UNITED STATES PATENTS

| | | |
|---|---|---|
| 2,099,047 | Bradshaw | Nov. 16, 1937 |
| 2,188,707 | Crocker | Jan. 30, 1940 |
| 2,451,177 | Semegen | Oct. 12, 1948 |
| 2,649,439 | Brown | Aug. 18, 1953 |